United States Patent [19]

Lester

[11] 4,022,160
[45] May 10, 1977

[54] FROG FEEDING APPARATUS

[76] Inventor: Dozier Lester, Rte. 1, Box 156F, Duson, La. 71422

[22] Filed: Oct. 28, 1975

[21] Appl. No.: 626,040

[52] U.S. Cl. .............................. 119/51 R; 119/61
[51] Int. Cl.² ...................................... A01K 5/00
[58] Field of Search ................ 119/51.5, 61, 51 R, 119/52 AF

[56] References Cited

UNITED STATES PATENTS

| | | | |
|---|---|---|---|
| 2,259,876 | 10/1941 | Berland | 119/51 R |
| 2,555,437 | 6/1951 | Edwards | 119/51 R |
| 2,951,464 | 9/1960 | Milliken | 119/51.5 |
| 3,015,308 | 1/1962 | Beresford | 119/52 AF |
| 3,527,192 | 9/1970 | Ferrara | 119/61 |

Primary Examiner—Hugh R. Chamblee
Attorney, Agent, or Firm—John M. Harrison

[57] ABSTRACT

An apparatus for feeding frogs which includes a bowl-shaped depression mounted in a box, the interior of the bowl being covered with a relatively thin plastic sheet. A motor equipped with an agitator is mounted inside the box with the agitator positioned immediately adjacent to and between the bowl and the plastic sheet. Activation of the motor effects movement of the plastic sheet as the agitator slowly rotates, thereby imparting movement to food particles which are placed in the bowl and on top of the plastic sheet.

3 Claims, 3 Drawing Figures

FROG FEEDING APPARATUS

BACKGROUND OF THE INVENTION

1. Cross-Reference to Related Application

A non-living frog food of the nature used in the apparatus of this invention is disclosed and claimed in my copending patent application Ser. No. 518,060, filed Oct. 25, 1974.

2. Field of the Invention

This invention relates to an apparatus for feeding frogs. The feeding mechanism causes the food to move, thereby stimulating the feeding instinct of the frogs. The feeder device of this invention is designed to be used in commercial frog raising operations and research projects, as well as under any conditions where frogs are kept and in any circumstances where it is desired to feed non-living food to frogs of any substantial size. The device is simple and easy to operate and effectively stimulates the feeding instinct of the frog by causing the food to move and appear lifelike after it is placed in the feeding mechanism.

DESCRIPTION OF THE PRIOR ART

It has been found by extensive study that frogs are reluctant to eat non-living food where no movement or motion is imparted to the food to simulate live action. Apparently the moving stimulus is necessary to trigger a frog's feeding instinct and frogs will literally starve to death, even when surrounded by non-living food, if that food is not caused to simulate the movement of a living organism.

Heretofore, there have been developed no known effective artificial means for presenting non-living food to frogs in such a manner as to trigger the feeding instinct in the frogs and cause them to feed. No only do frogs apparently need a living or simulated living stimulus to trigger the feeding instinct, but the food must also be of such texture as to cause the frog to swallow the food after it is received in its mouth. Commercial feeding operations have generally been limited to the provision of live insects, worms, minnows and crawfish for feeding frogs. This is difficult, in that elaborate measures must be taken to insure that this living food is first collected or raised and secondly, placed in the environment with the frogs so that it cannot escape. This technique has not met with any significant degree of success chiefly because of the difficulties in supplying a sufficient quantity of live food to meet the demand of the frogs, particularly in the case of large scale frog raising operations.

Accordingly, an object of this invention is to provide a mechanism for imparting lifelike movement to non-living food for frogs.

Yet another object of this invention is to provide a frog feeding mechanism which utilizes a motor and agitator to cause non-living food to move in a lifelike manner, thereby triggering the feeding instinct of one or more frogs.

Another object of the invention is to provide a frog feeding mchanism which utilizes a flexible plastic bowl which is moved by a motor-driven agitator to cause food particles in the bowl to undulate, and thereby simulate living organisms.

A still further object of the invention is to provide a frog feeding apparatus which consists of a bowl having a bottom covered with a thin sheet of plastic. The bowl has a motor mounted thereunder, and the agitator, which is located between the plastic sheet and the bottom of the bowl, causes food placed on top of the plastic to move in a lifelike manner.

SUMMARY OF THE INVENTION

These and other objects of the invention are provided in a frog feeding apparatus which includes the following elements:

1. A relatively shallow bowl mounted in a box;
2. A thin plastic liner placed inside the bowl and forming the bottom and sides of the bowl; and
3. A motor assembly mounted underneath the bowl with an agitator directly under and in contact with the plastic to impart movement to the plastic when the motor is activated.

BRIEF DESCRIPTION OF THE DRAWINGS

The invention will be better understood in view of the following description presented with reference to the accompanying drawing.

DESCRIPTION OF THE PREFERRED EMBODIMENTS

Figure 1:
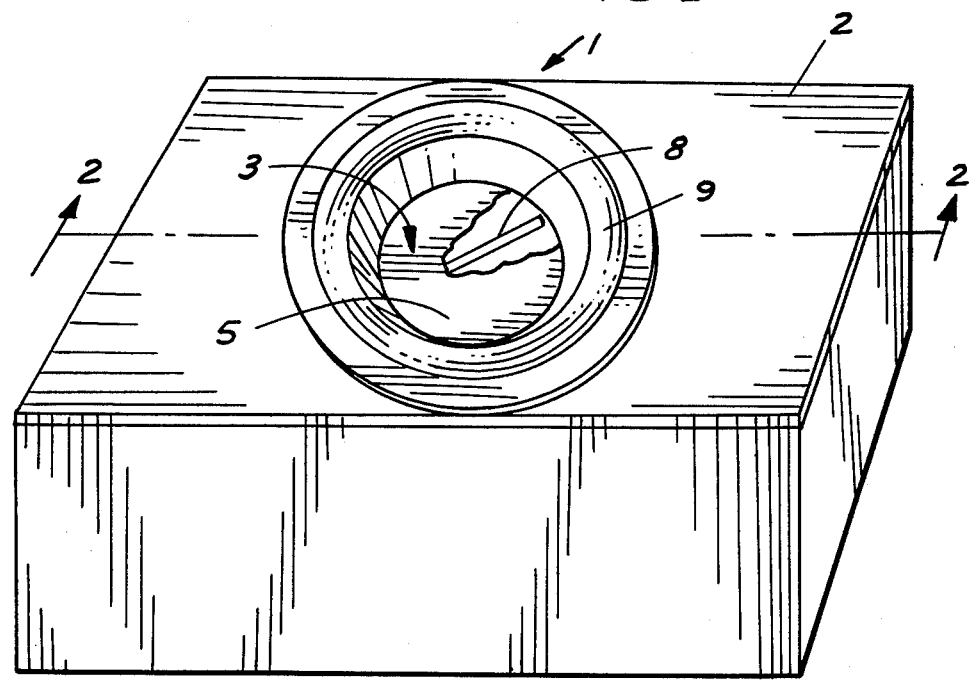
FIG. 1 of the drawing is a perspective view of a preferred frog feeding apparatus of this invention.
Figure 2:
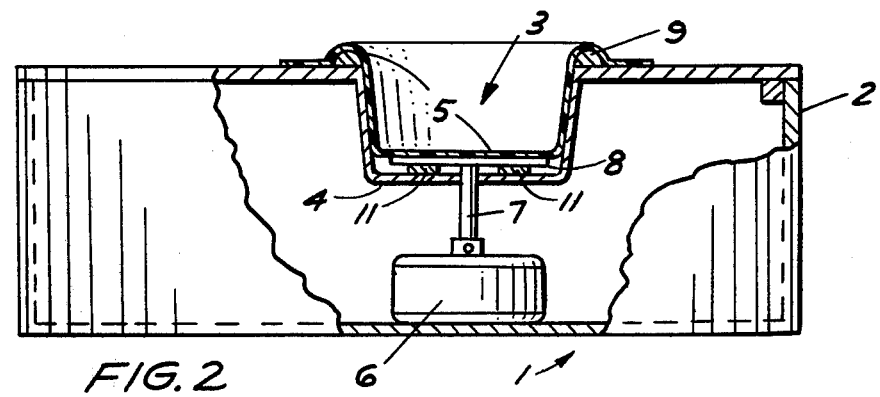
FIG. 2 is a front sectional elevation of the frog feeding apparatus taken along line 2—2 in FIG. 1.
Figure 3:
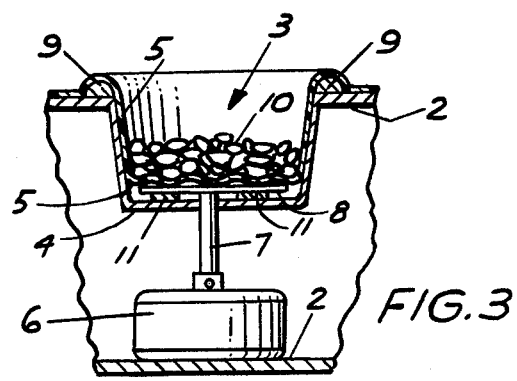
FIG. 3 is a front elevation, partially in section, of the apparatus illustrated in FIGS. 1 and 2.

Referring now to FIGS. 1 and 2 of the drawing, the feeder apparatus of this invention, generally illustrated by reference numeral 1, is shown with feeder box 2, carrying feed container 3 which is a bowl-shaped depression in feeder box 2. Feed container 3 is formed by feed container base 4 [illustrated more particularly in FIG. 2], feed container rim 9 and plastic liner 5, the latter of which rests on agitator 8 of motor 6 in a preferred embodiment of the invention. As illustrated in FIGS. 2 and 3 of the drawing, feed container base 4 extends below plastic liner 5, and is separated from agitator 8 by means of washers 11. Motor 6 and agitator 8, interconnected by motor shaft 7, are positioned so as to cause plastic liner 5 to slowly undulate as motor 6 is activated and agitator 8 slowly rotates in contact with plastic liner 5. Accordingly, referring particularly to FIG. 3 of the drawing, when a selected frog food 10 is placed on top of plastic liner 5 in feed container 3 and motor 6 is activated, the undulating action of plastic liner 5 causes frog food 10 to move. This movement simulates a lifelike action, and experiments have conclusively shown that frogs are readily willing to eat the food under these conditions whereas they would not feed, no matter how hungry, if such a movement was not imparted to the food.

It will be appreciated by those skilled in the art that movement to the frog food 10 can be effected by alternative movements of agitator 8, including a reciprocating agitator action, as well as a rotating action. Still other mechanical techniques known to those skilled in the art may be utilized for causing the food 10 to move, thereby imparting lifelike movement to the food.

A typical food which has been found highly satisfactory for use in the frog feeding mechanism of this invention is crawfish heads, either cooked or uncooked. The heads are placed in the feed container, the agitator motor is activated, and the heads are caused to slowly and gently move with respect to each other and the plastic bowl bottom and appear to be alive due to the motion of the agitator.

Accordingly, having described my invention with the particularity set forth above what is claimed is:

1. A frog feeding apparatus comprising:
   a. a box member having a bottom wall, side walls and a top wall, the top wall being provided with a cylindrically shaped depression means having side walls depending from the top wall and a base member,
   b. a flexible liner fitted in and lining the depression means,
   c. and agitator means positioned within the box including a motor with a drive shaft extending through the base member of the depression means with an agitator member on an end of the drive shaft above the base member and below the flexible liner, whereby rotation of the agitator member imparts movement of frog food within the flexible liner.

2. The frog feeding apparatus of claim 1 including washers between the agitator member and the base member of the depression means to space the agitator member from said base member.

3. The frog feeding apparatus of claim 1 wherein the agitator motor is operated at a slow speed.

* * * * *